US009214088B2

(12) United States Patent
Kreitmair-Steck et al.

(10) Patent No.: US 9,214,088 B2
(45) Date of Patent: Dec. 15, 2015

(54) OBSTACLE INFORMATION SYSTEM OF A HELICOPTER

(71) Applicant: AIRBUS HELICOPTERS DEUTSCHLAND GMBH, Donauworth (DE)

(72) Inventors: Wolfgang Kreitmair-Steck, Munich (DE); Benno Van Noort, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 306 days.

(21) Appl. No.: 13/908,270

(22) Filed: Jun. 3, 2013

(65) Prior Publication Data

US 2013/0332062 A1  Dec. 12, 2013

(30) Foreign Application Priority Data

Jun. 6, 2012  (EP) .................................... 12400019

(51) Int. Cl.
| | | |
|---|---|---|
| *G08G 5/04* | (2006.01) | |
| *G01S 17/93* | (2006.01) | |
| *G01S 13/93* | (2006.01) | |
| *G01S 7/06* | (2006.01) | |
| *G01C 23/00* | (2006.01) | |

(52) U.S. Cl.
CPC  *G08G 5/04* (2013.01); *G01C 23/00* (2013.01); *G01S 7/062* (2013.01); *G01S 13/9303* (2013.01); *G01S 17/933* (2013.01)

(58) Field of Classification Search
CPC ......... G08G 5/04; G08G 5/045; G08G 5/021; G08G 5/0078; G01S 13/9303
See application file for complete search history.

(56) References Cited

U.S. PATENT DOCUMENTS

| | | | | |
|---|---|---|---|---|
| 4,075,892 A | * | 2/1978 | Burckhardt | ..................... 73/495 |
| 5,371,581 A | * | 12/1994 | Wangler et al. | ............... 356/5.01 |
| 5,969,665 A | * | 10/1999 | Yufa | ............................... 342/41 |
| 6,433,679 B1 | * | 8/2002 | Schmid | ........................ 340/435 |

(Continued)

FOREIGN PATENT DOCUMENTS

| | | |
|---|---|---|
| DE | 102006053354 A1 | 5/2008 |
| DE | 102007014878 A1 | 10/2008 |

(Continued)

OTHER PUBLICATIONS

Search Report and Written Opinion; Application No. EP 12400019; dated Oct. 10, 2012.

*Primary Examiner* — Thomas G Black
*Assistant Examiner* — Peter D Nolan
(74) *Attorney, Agent, or Firm* — Brooks Kushman P.C.

(57) ABSTRACT

An obstacle information system and method for a helicopter with a warning information processor (3) and a display unit (1) for any obstacle (2) within a predetermined minimum distance d4. Said warning information processor (3) is fed with information related to detected distance d5 and direction of said at least one obstacle (2) detected by an obstacle sensor system (4) to compute and prepare the information for presentation on the display unit (1). Said display unit (1) comprises at least an indication area with a central circular surface (6) and a concentric ring-shaped area (7) around the circular surface (6). Said circular surface (6) is used exclusively for alerts. The ring-shaped area (7) is used for both. Warnings and alerts and the repartition in the indication area of circular surface (6) and ring-shaped area (7) are dependent on the detected distance d5 of said at least one obstacle (2).

20 Claims, 10 Drawing Sheets

State of the Art

(56) References Cited

U.S. PATENT DOCUMENTS

| | | |
|---|---|---|
| 7,463,183 B2 | 12/2008 | Reich |
| 8,249,762 B1 | 8/2012 | Flotte |
| 8,271,186 B2 * | 9/2012 | Nouvel et al. ................. 701/301 |
| 2002/0008640 A1 * | 1/2002 | Horvath et al. ............... 340/945 |
| 2008/0180310 A1 * | 7/2008 | Reich ............................ 342/30 |
| 2010/0100326 A1 * | 4/2010 | Nouvel et al. ................. 701/301 |
| 2010/0201544 A1 * | 8/2010 | Ganille et al. ................. 340/933 |
| 2010/0299067 A1 * | 11/2010 | McCollough et al. ........ 701/301 |
| 2012/0029738 A1 | 2/2012 | Brunetti |
| 2013/0128258 A1 | 5/2013 | Glad |
| 2014/0104080 A1 * | 4/2014 | Maddanimath et al. ...... 340/945 |
| 2014/0249738 A1 * | 9/2014 | Euteneuer et al. ............ 701/301 |

FOREIGN PATENT DOCUMENTS

| | | |
|---|---|---|
| EP | 2388760 A1 | 11/2011 |
| FR | 2932279 A1 | 12/2009 |
| WO | 2008116456 A1 | 10/2008 |
| WO | 2011136707 A1 | 11/2011 |

\* cited by examiner

Fig. 1, State of the Art

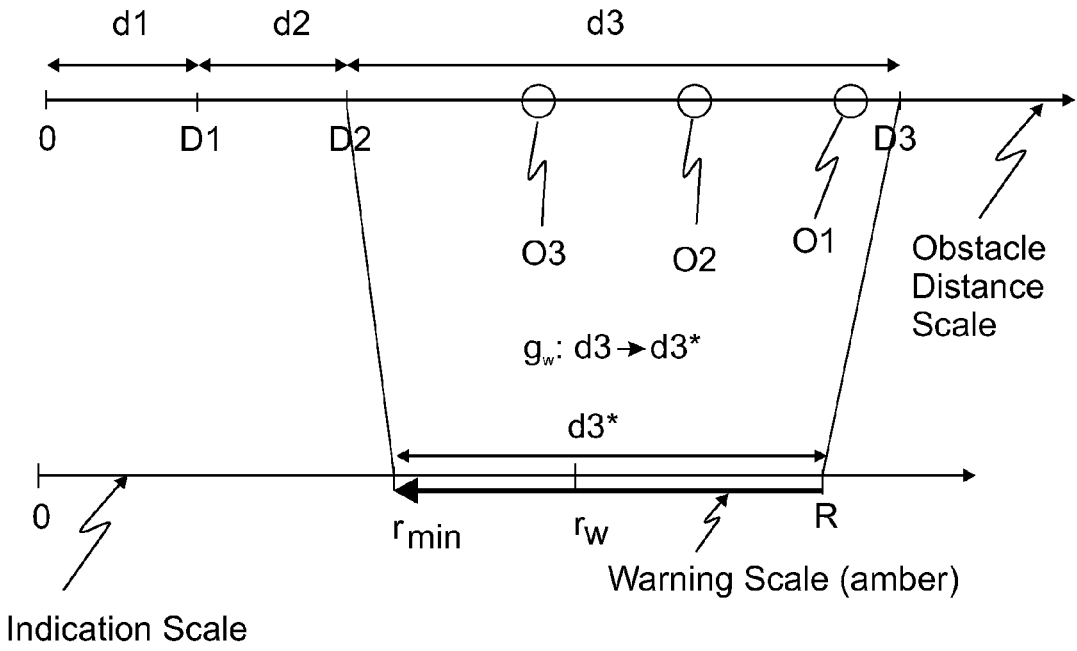
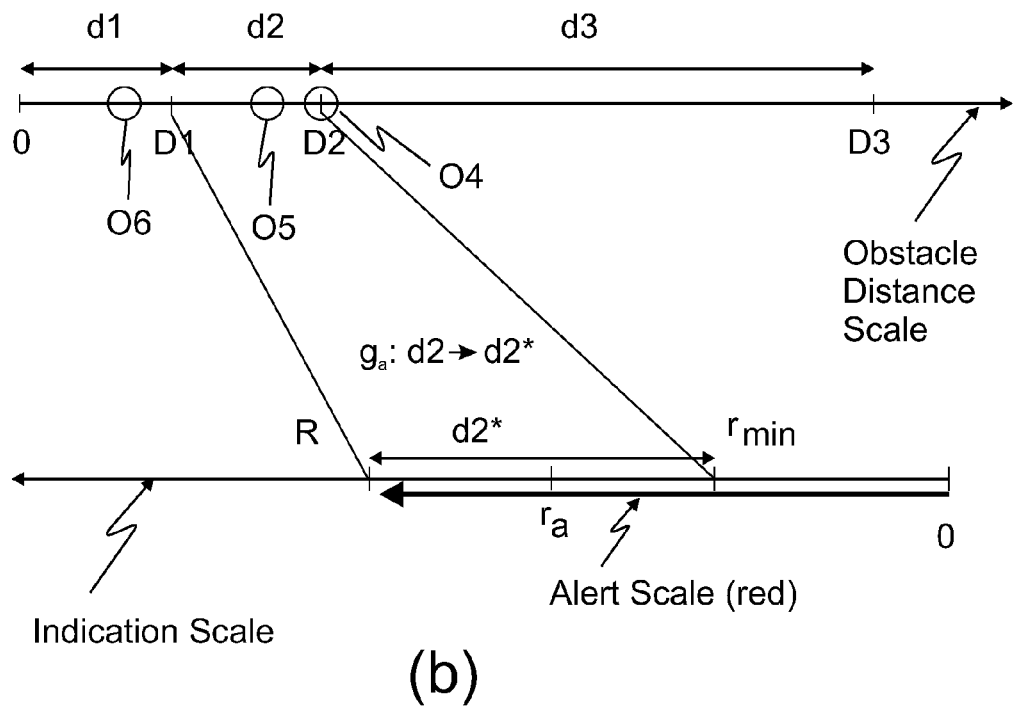
Fig. 5

 Buildings
 Vegetation
 Terrain
 Power Lines
 Moving Objects
Fig. 11

OBSTACLE INFORMATION SYSTEM OF A HELICOPTER

CROSS REFERENCE TO RELATED APPLICATIONS

This application claims priority to European patent application No. 12 400019.1 filed Jun. 6, 2012, the disclosure of which is incorporated in its entirety by reference herein.

BACKGROUND OF THE INVENTION (1) Field of the Invention

The invention is related to an obstacle information system of a helicopter with the features of the preamble of claim 1 and to a method of operating an obstacle information system with the features of claim 14.

(2) Description of Related Art

A proximity sensor of an aircraft detecting an obstacle or several obstacles, such as buildings, towers, power lines, terrain etc. in a certain direction around the aircraft and within a critical distance with respect to the aircraft, essentially provides a warning or an alert to the pilot. The more critical the obstacles are for the aircraft, the more visible and flashy the warning/alert should be. According to a general assumption there are two zones around the aircraft: a warning zone and an alert zone. If there are any obstacles within one of these zones, a warning or alert should be submitted to the pilot—this warning or alert should be given as long as the aircraft is within the respective zones. Currently known warning instruments don't satisfy all the requirements concerning the situation awareness of the pilots.

The document WO 2011/136707 A1 discloses an obstacle detection and information system of a helicopter arranged to be transmitting laser light and receiving reflected laser light from obstacles for detecting and informing the pilot of a helicopter of obstacles in proximity of the helicopter. The system comprising an obstacle detection sensor unit, being arranged to be mounted on a rotor head of a helicopter such that said obstacle detection sensor unit is arranged to rotate with said rotor head when mounted, further comprising an information unit. The transmitted laser light is arranged to cover a sector volume around a rotor head axis, having a coverage defined as a radial extension (R1, R2) in a sector plane around said rotor head axis and an angular extension perpendicular to said sector plane, and wherein communication means are arranged for communication between said sensor unit and said information unit.

The document DE 10 2006 053 354 B4 discloses a panoramic obstacle detection and warning system comprising radar sensors and a display means for the warnings. Several alternatives are proposed for said detection and warning system: 1. Indication of a horizontal obstacle by colouring a respective sector of a round instrument with red or amber colours; 2. Indication of an obstacle by circles or ellipses on a 2D navigation or mission display in range and direction relative to the helicopter symbol; and 3. Indication of the risk levels and spatial hazard picture by coloured, range dependent bars in a joint display. Disadvantages remain for any of these alternatives: Ad 1: There are only two levels of warnings: amber (warning) and red (alert). The pilot has no idea about how the helicopter is moving inside the different zones—reducing or increasing the distance to the obstacle; Ad 2: The visibility of the warning is only increased by the change of the colours: from amber to red. There is no intensification of the visual representation foreseen; and Ad 3: This representation of the warning/alert function might be considered to be too abstract for the pilot since there are only four different directions according to the 90° sectors represented. Any interpolation is left to the interpretation of the pilot.

The document U.S. Pat. No. 8,249,762 B1 discloses a device for monitoring obstructions for an aircraft including data storage, an anti-collision device and viewing devices, wherein the monitoring device comprises a detector to detect in real-time obstructions, of terrain type and of human constructions type, in a close environment of the aircraft in a flight situation, a sensor to identify the obstructions at risk calculating identification parameters, a circuit to calculate criticality of the obstructions, a display to display both the obstructions with the identification and criticality parameters of the obstructions, and a generator of alerts to describe the situation according to a combination of the identification and criticality parameters.

The document WO 2008/116456 A1 discloses an all-around identification of obstacles within the movement area of a helicopter using radar, laser and/or ultrasonic sensors. The ranges of the sensors that are used are selected in accordance with the movement area and the installation locations of the sensors on the helicopter, predetermined scanning movements related to the scanning area are communicated to the sensors and all measuring signals of the sensors received by means of reflection and their individual positions are fed to a common database after an individual signal evaluation that is ordered according to the scanning area, said signals being respectively referenced in terms of distance and direction with the position of the helicopter and being fed in the form of a received reflective field in order to combine all reflective fields and compare them with patterns stored in the database. The complete layout of the movement area that is to be monitored is determined using a subsequent algorithmic evaluation and is displayed as a complete image in the cockpit of the helicopter.

The document U.S. 2012/029738 A1 discloses an aircraft capable of hovering by having at least one sensor, which has a plane sweep region and is designed to acquire, when the aircraft is maneuvering, values of respective distances between first points on an obstacle within the plane sweep region, and a second point on the aircraft; and a control unit designed to generate an alarm signal when at least one of the first points lies within a safety region containing the second point on the aircraft.

BRIEF SUMMARY OF THE INVENTION

The object of the invention is to provide an obstacle information system of a helicopter without the limitations of the state of the art and to provide a method of operating such an obstacle information system.

The solution is provided with an obstacle information system of a helicopter with the features of claim 1 and with a method of operating an obstacle information system with the features of claim 14. Preferred embodiments of the invention are provided according to the subclaims.

According to the invention an obstacle information system of a helicopter comprises a warning information processor and a display unit of obstacles. Any obstacle within a predetermined minimum distance d4 with regard to said helicopter is detected by an obstacle sensor system mounted on the helicopter to compute and prepare the information for display on the display unit to pilot(s) of the helicopter. Said warning information processor is fed with information related to detected distance, direction and optionally the category/type of any obstacle within the predetermined minimum distance d4 with regard to said helicopter. Said display unit comprises at least an indication area.

The indication area comprises two sub-areas, a circular surface and an outer ring-shaped area around the central circular surface. The warning information processor computes and prepares the information with regard to detected distance, direction and optionally the category/type of any obstacle in a way that said circular surface is used exclusively for alerts while the ring-shaped area is used for both, warnings and alerts. The repartition of circular surface and ring-shaped area in the indication area is fixed. The indication in one or both of the surfaces of the display unit is dependent on the detected distance d5 of said at least one obstacle with regard to said helicopter. The inventive obstacle information system allows the information, processed and prepared from a per se known obstacle detection sensor system concerning direction and distance and optionally of the type of the obstacle(s), to be sent to the display unit with an unambiguous distinction between warning and alerting for the pilot.

According to the invention there is a warning to the pilot of the helicopter, if an obstacle is within the warning zone and there is an alert to the pilot of the helicopter, if an obstacle is within the alerting zone and above all there is a gradual increase of visibility and presence with regard to the obstacle information for the pilot's awareness of said obstacle(s) if the helicopter is approaching the obstacle(s), whereas the level of attention provoked by the inventive obstacle information system is reduced if the pilot is dislodging with his helicopter from the obstacle. By the use of different colors e.g. the color red for alerts and amber for warnings, warnings and alerts are always clearly distinguishable. Whenever at least a section of the circular surface is filled, preferably with red colour, this indicates an alert; if only at least a section of the ring-shaped area is filled, preferably applying amber colour, the indication provides a warning. The warning information processor prepares the information about distances of obstacles according to the described inventive warning and alerting method adequately for presentation on the display unit of the inventive obstacle information system.

According to a preferred embodiment of the invention the display unit comprises an instrument status indication for the correct functioning of the inventive obstacle information system, e.g. by a green light, the malfunctioning, e.g. by a red light or the out-of-operation status of the instrument, e.g. without any light.

According to a further preferred embodiment of the invention the circular surface has a minimum outer radius $r_{min}$ and the ring-shaped area has an outer radius R and an inner radius extending till the minimum outer radius $r_{min}$ of the circular surface. In a preferred variant of the invention, this radius $r_{min}$ is greater or equal to R/2.

According to a further preferred embodiment of the invention the radius rw for the warning indication and the radius $r_a$ for the alert indication are always greater than or equal to $r_{min}$ but smaller or equal to R. In case of an alert indication, the radius $r_a$ of the circular surface is greater or equal to $r_{min}$. The inner circular surface with minimum radius $r_{min}$ and the ring-shaped area with the outer radius R are respectively related to the different warning and alerting zones around the helicopter: the smallest circular surface with radius $r_{min}$ is related to the outer alert diameter d1+d2 around the helicopter, the radius R of the ring-shaped area is related to the outer diameter of the warning zone at a distance d4 from the helicopter. If an obstacle O3 is detected within the warning zone $z_w$ at a distance d5, there is a warning indication at the display unit by coloring at least a section of the ring-shaped area with inner radius $r_w$, said inner radius $r_w$ being preferably the result of a projection $g_w$ from the section d3 of the distance scale onto d3* of the indication scale. This projection results in a smaller inner radius $r_w$ of the colored ring-shaped surface if the obstacle O3 is closer to the present maximum alerting distance d1+d2 and consequently results in a greater overall colored ring-shaped surface.

In a preferred embodiment of the invention, the projection $g_w$ of the distance of an obstacle O3 relative to the helicopter is a logarithmic projection, in another preferred embodiment of the invention, the projection $g_w$ is linear.

If an obstacle O5 is within the alerting zone $z_a$ at a distance d5 greater than d1, then the radius $r_a$ of the circular surface is the result of a projection e.g. $g_a$ from the section d2 of the distance scale onto d2* of the indication scale. The projection is done in such a way, that the closer the distance d5 is to d1, the closer $r_a$ is to R. If an obstacle O6 is closer to the helicopter than distance d1, then the radius of the circular surface $r_a$=R. Furthermore, if this obstacle O6 is in the direction of the flight path, additional warning indications, e.g. aural or haptic, can be provided in order to increase the attention of the pilot.

In a preferred embodiment of the invention, the projection $g_a$ is a linear projection.

For helicopters, in a preferred embodiment of the invention, the values for d1 and d2 should be greater or equal to the rotor diameter, the value for d3 should be greater or equal to the double of the rotor diameter of the helicopter.

By applying this projection method, the indication is more attention calling the closer the obstacle is to the helicopter. First, by increasing the actual warning display area if the obstacle is coming closer within the warning zone, second by increasing the alert display area up to the maximum possible area, if the obstacle is coming closer within the alerting zone.

By switching from warning mode to alerting mode, the original amber warning indication can be maintained and partially overwritten by the red alert or it may be omitted and replaced by the red alert indication.

This indication of warnings and alerts can be extended by an indication of the sector/direction around the aircraft in which the obstacle has been detected. If this option is provided, at least four different sections should preferably be distinguished: front and rear, as well as left and right. Thus in addition to warning the pilot about the proximity of an obstacle, in a preferred variant of the invention, there is also provided information to the pilot about the direction of the obstacle relative to the flight path of the helicopter.

The final indication consists then of the intersection of this obstacle sector indication and the distance warning/alert indication described above. A preferred variant of the above mentioned division in sectors consists of 12 sectors, each with an angle α of 30°.

In a further preferred variant, the alert indication can be made even more attention catching, if the area of the intersected alert sector is artificially increased—in addition to the increase of the radius $r_a$—by an increase of the display angle γ (i.e. γ/2 to the left and γ/2 to the right of the obstacle direction) of the sector of the circular surface area.

According to a further preferred variant of the invention a category/type information for any detected obstacle(s) is overlaid as a symbolic obstacle category indication based on a catalogue of object symbols representing the distinguishable objects communicated from the obstacle sensor system to the warning or alert indication.

Of course, the same system applies, in case there should be more than one obstacle next to the operating helicopter resulting in the indication of multiple warning/alert sectors. In case that more than one obstacle is in a certain direction/sector, it is always the closest obstacle to the aircraft which has priority for the indication.

According to a preferred variant of the invention a method is provided of operating such an obstacle information system.

BRIEF DESCRIPTION OF THE SEVERAL VIEWS OF THE DRAWINGS

Preferred embodiments of the invention are described with reference to the following description and the attached drawings.

FIGS. 5(a)-5(b) show projections of obstacles from obstacle distance scales to indication scales of the obstacle information system of a helicopter according to the invention, FIG. 11 shows symbols of obstacles for representation in display units of the obstacle information system of a helicopter according to the invention.

DETAILED DESCRIPTION OF THE INVENTION

Figure 1:
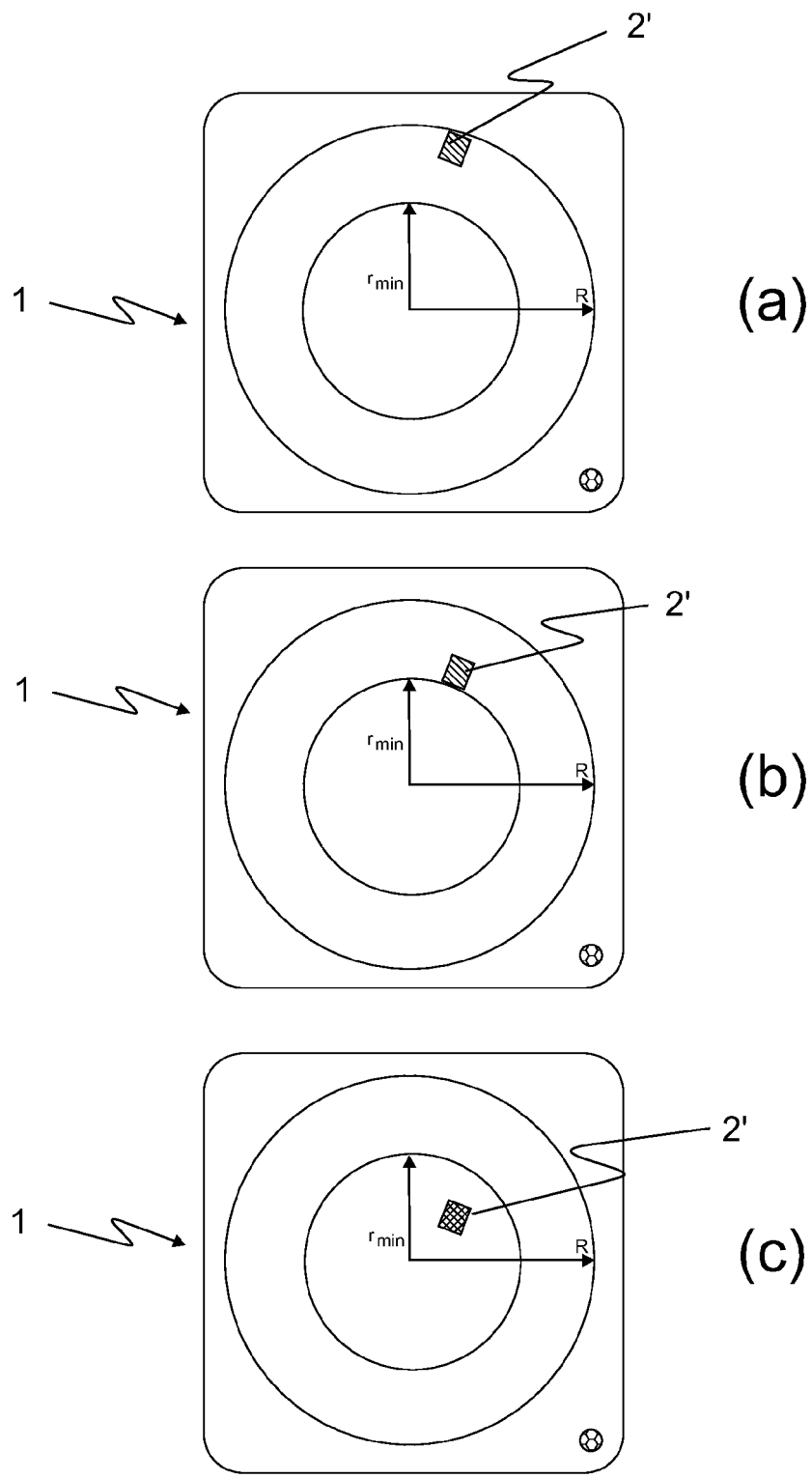
FIGS. 1(a)-1(c) show display samples for obstacles according to the state of the art.

According to FIG. 1 display samples are shown for a representation 2' of an obstacle on a display unit 1 according to the state of the art. Said display unit 1 is usually divided in two sections: an inner circular surface with a radius $r_{min}$ and an outer ring shaped surface around said inner circular surface, said outer ring shaped surface having an outer radius R and the inner radius $r_{min}$. The obstacle is reflected at three different distances with regard to a center of detection of said obstacle by the display unit 1. The color of the obstacle symbol turns into amber while the obstacle representation 2' passes through the outer ring shaped surface of the display unit 1. At a reduced distance of the obstacle with regard to the center of detection the visibility of warning to a pilot is increased by a change of colors from amber to red for the obstacle symbol, said change of colors occurring if the distance of the obstacle representation 2' is closer to the center than $r_{min}$. The outer radius R and the radius $r_{min}$ of the display unit 1 of said state of the art are related to the warning radius and the alerting radius and fix.

Figure 2:
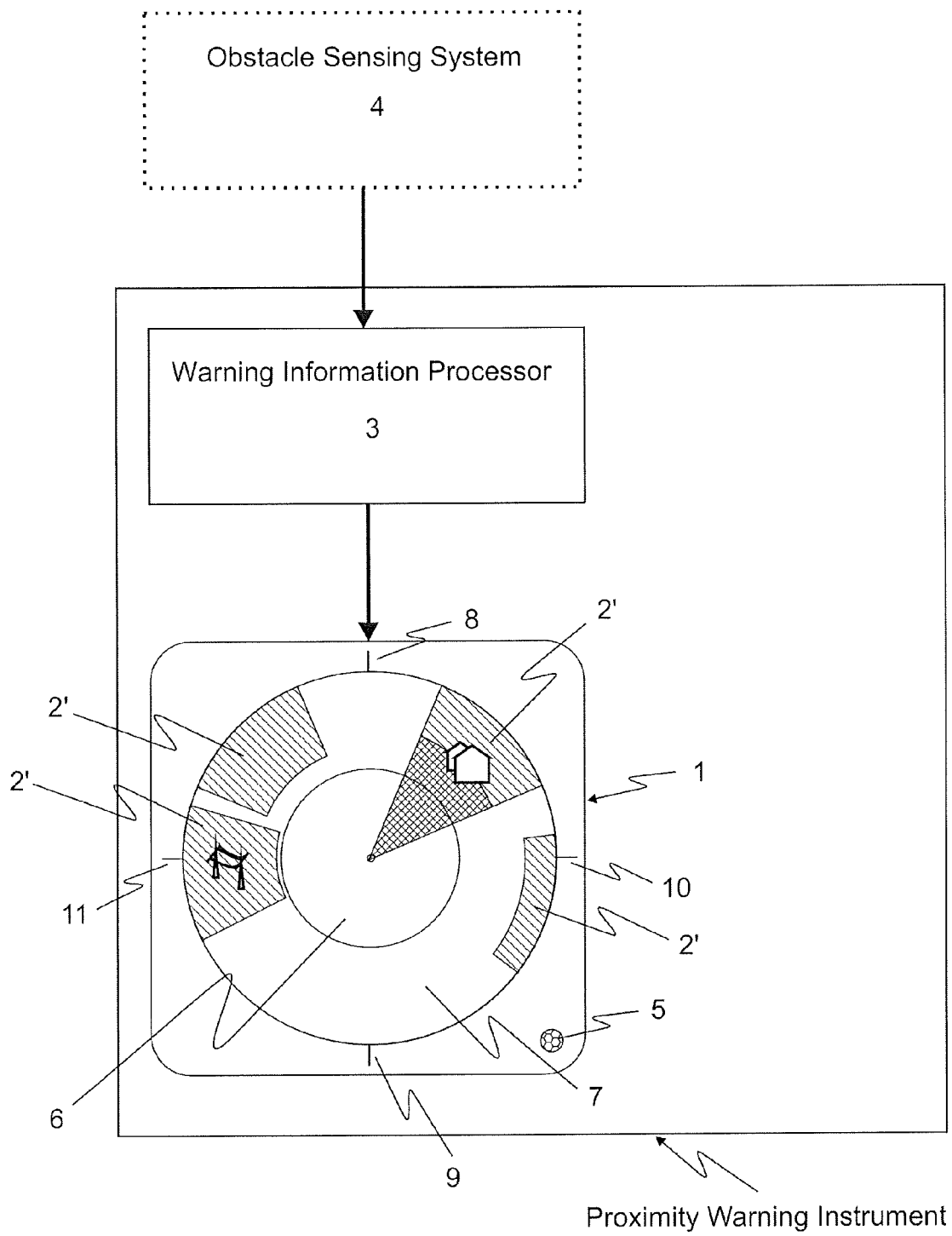
FIG. 2 shows the architecture of an obstacle information system of a helicopter according to the invention.

According to FIG. 2 corresponding features are referred to with the references of FIG. 1. An obstacle information system of a helicopter comprises a warning information processor 3 and the display unit 1. The warning information processor 3 receives data of obstacles 2 within a predetermined distance detected by a standard obstacle sensor system 4 said data regarding the distance, the direction and possibly the category/type of the obstacles 2. The warning information processor 3 computes and prepares the information for presentation as a warning or an alert at the display unit 1.

The display unit 1 comprises an indication area with two sub areas for the warning/alerting details and an instrument status indication 5 for indication of the correct functioning, e.g. by a green light, the malfunctioning, e.g. by a red light or the out-of-operation status of the instrument, e.g. without any light. The display unit 1 comprises a front reference mark 8, a rear reference mark 9, a right reference mark 10 and a left reference mark 11. The display unit 1 is either realized as a cockpit instrument by means of LED arrays, LED-display or OLED-display or as a Head-Up display or as a Helmet Mounted Display.

One of the two sub-areas of the indication area corresponds basically to a central circular surface 6 and the other of the two sub-areas to a ring-shaped area 7 concentric around the circular surface 6. The circular surface 6 is used exclusively for alerts, while the ring-shaped area 7 is used for both, warnings as well as alerts. The circular surface 6 and a subsection of the ring-shaped area 7 is filled with red colour for indication of an alert. The ring-shaped area 7 or a section of the ring-shaped area 7 is filled at least partially with amber color for indication of a warning.

Figure 3:
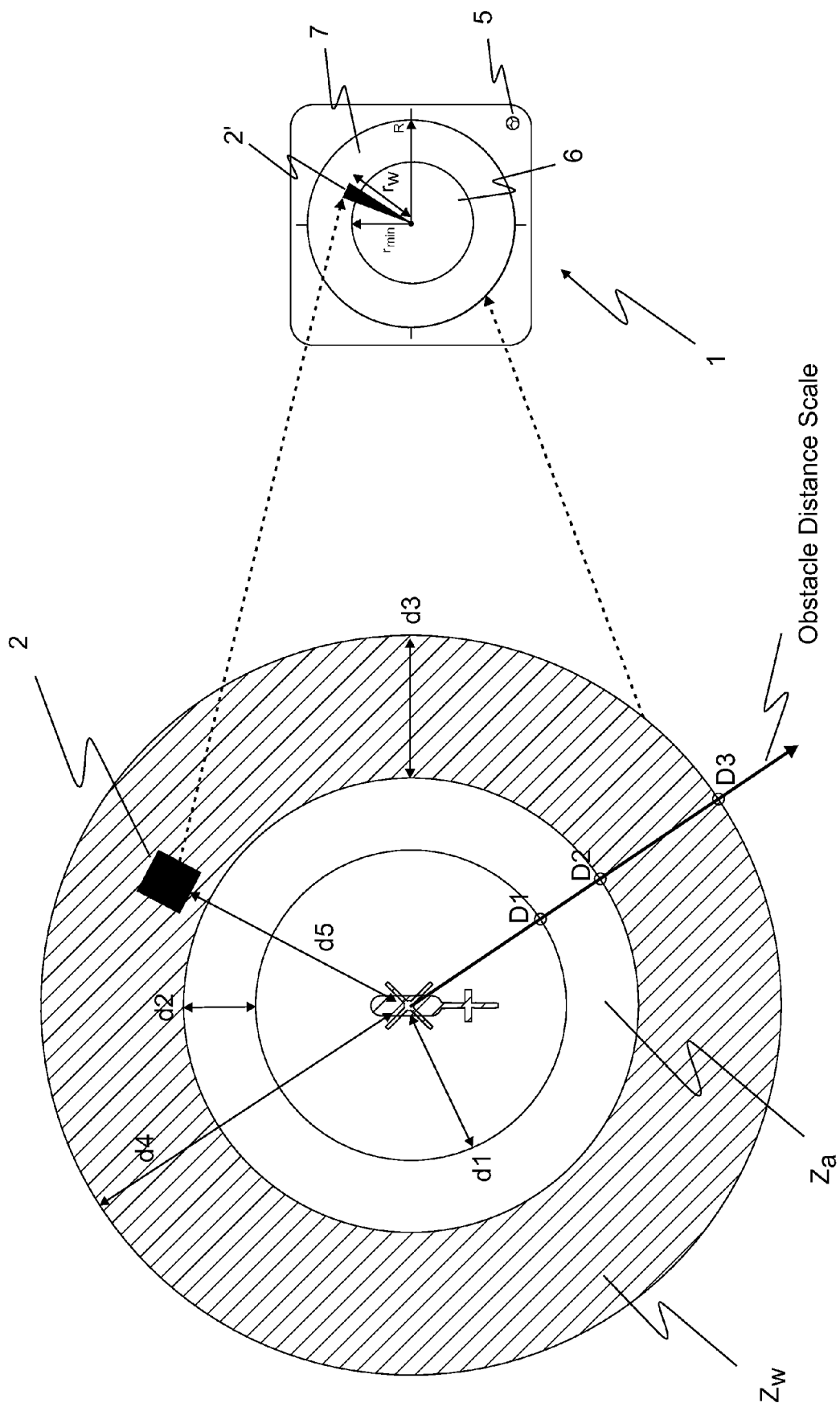
FIG. 3 shows a projection of the real obstacle situation to a display unit of the obstacle information system of a helicopter according to a variant of the invention.

According to FIG. 3 corresponding features are referred to with the references of FIGS. 1 and 2. A "real world situation" of the helicopter operating in proximity to an obstacle 2 is projected by the warning information processor 3 from the helicopter with the obstacle sensor system 4 to the display unit 1 with the central circular surface 6 and the concentric ring-shaped area 7. The circular surface 6 of the display unit 1 has a minimum radius $r_{min}$ and the ring-shaped area 7 has an outer radius R and an inner radius equal to the minimum radius $r_{min}$ of the circular surface 6. The radius $r_{min}$ is greater or equal to R/2.

The "real world situation" of the helicopter is subdivided in three zones: an outer ring shaped warning zone $z_w$, a concentric inner ring shaped alert zone $z_a$ and a central circular zone around the helicopter. The outer ring shaped warning zone $z_w$ has an inner warning radius of d1+d2 and an outer warning radius of d1+d2+d3=d4. The concentric inner ring shaped alert zone $z_a$ has an inner alert radius of d1 and an outer alert radius of d1+d2. The central circular zone around the helicopter inside the concentric inner ring shaped alert zone $z_a$ has a radius of d1.

The projection of the obstacle 2 with a distance d5 from the helicopter in the "real world situation" to the display unit 1 results in a presentation 2' of the obstacle 2 at the display unit 1 with a radius $r_w$ for the warning indication, said radius $r_w$ being greater than the minimum radius $r_{min}$ of the circular surface 6 but smaller than outer radius R.

Figure 4:
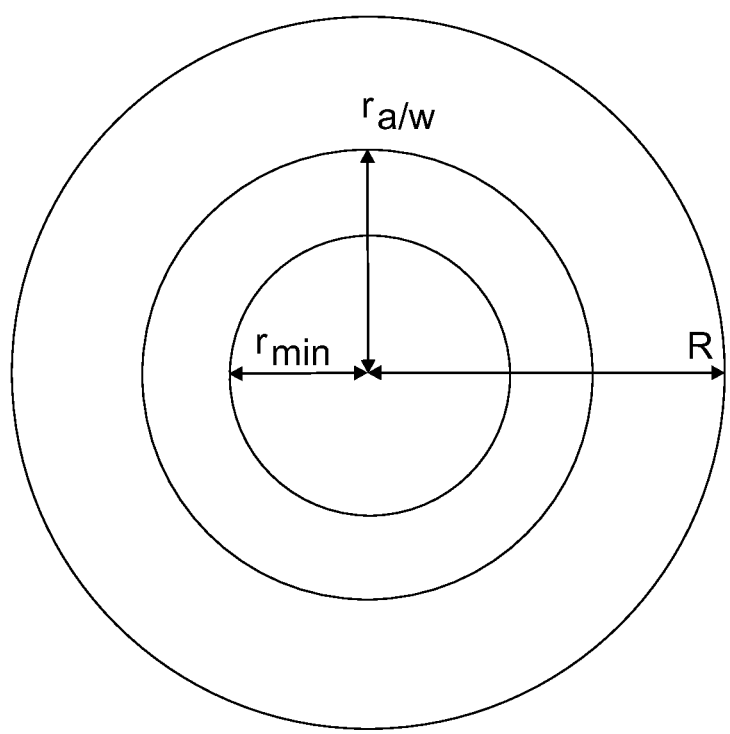
FIG. 4 shows the main radii of the display unit of the obstacle information system of a helicopter according to the invention.

According to FIG. 4 corresponding features are referred to with the references of FIGS. 1 to 3. A radius $r_a$ for the alert indication and the radius $r_w$ for the warning indication are always greater than or equal to $r_{min}$ but smaller or equal to R. In case of an alert indication of an obstacle 2 within the ring shaped alert zone $z_a$ between the inner alert radius of d1 and the outer alert radius of d1+d2, the circular surface on display unit 1 has the radius $r_a$. The radius $r_{a/w}$ with $r_{min}<=r_{a/w}<=R$, is related to the location of the obstacle 2 in any of the different warning or alerting zones around the helicopter: the smallest circular surface 6 with radius $r_{min}$ is related to the location of the obstacle 2 in the alert distance d1+d2 around the helicopter, the smallest ring shaped area 7 with an inner radius $r_w$ close to the outer radius R is related to the location of the obstacle 2 at the outer border of the warning zone $z_w$ at a distance d5 from the helicopter a bit smaller than d4.

According to FIG. 5 corresponding features are referred to with the references of FIGS. 1 to 4. FIG. 5a represents projections $g_w$ of three sample obstacles O1, O2, O3 within the warning zone $z_w$ with different distances d5 (see FIG. 3) from the helicopter according to a warning scale for the display unit 1. The closer the obstacles O1, O2, O3 within the warning zone $z_w$ are to the alert zone $z_a$ of the helicopter, the smaller is the inner radius $r_w$ of the ring shaped area 7 (see FIG. 3) and consequently the greater is the overall surface of the ring shaped area 7. FIG. 5b represents projections $g_a$ of three sample obstacles O4, O5, O6 within the alert zone $z_a$ with different distances d5 from the helicopter according to an alert scale for the display unit 1. The closer the obstacles O4, O5, O6 are to the helicopter within the alert zone $z_a$, the greater is the inner radius $r_a$ of the circular surface 6 and consequently the greater is the circular surface 6.

If the obstacle O3 is within the warning zone $z_w$ at a distance d5 to the helicopter, there is a warning indication at the display unit 1 by amber colouring of the ring-shaped area 7 or a section of the ring-shaped area 7 with the inner radius $r_w$, said inner radius $r_w$ being the result of a projection $g_w(O3)$ from the section d3 of the distance scale onto d3*, with d3*=R−$r_{min}$ of the warning scale. The projection $g_w$ is either logarithmic or linear.

If the obstacle O5 is within the alerting zone $z_a$ at a distance d5 greater than d1 to the helicopter, then the radius $r_a$ of the circular surface 6 is the result of a projection $g_a(O5)$ from the section d2 of the distance scale onto d2* of the alert scale. The projection $g_a$ is done in such a way, that the closer the distance d5 is to d1, the closer is $r_a$ to R. The projection $g_a$ is a linear projection. An obstacle O6 closer than distance d1 to the helicopter results in a radius $r_a$=R for the circular surface 6. Furthermore, if the obstacle O6 is in the direction of the flight path of the helicopter, additional warning indications, such as aural or haptic, can be provided in order to increase the attention of the pilot. For helicopters d1 and d2 each should be greater or equal to the main rotor diameter, the value for d3 should be greater or equal to the double of the main rotor diameter.

The projections $g_w$ and $g_a$, and the intended warning radius $r_w$ for an object O2 or the alerting radius $r_a$ for an object O4 are represented by the following example, assuming linear projections:

Let d1=1250 cm, d2=1250 cm, d3=5000 cm, R=5 cm
and $r_{min}$=2 cm, O2=5800 cm, O4=2500 cm then d2*=3 and d3*=3, $SF_w$:=(R−$r_{min}$)/(D3−D2), $SF_a$:=(R−$r_{min}$)/(D2−D1)

$g_w$:[0,5000]→[0,3], $g_w(x)$:=$SF_w$*x $g_a$:(0,1250]→[0,3], $g_a(x)$:=$SF_a$*x;

and $r_w(O2)=g_w(O2-D2)+r_{min}$ $r_a(O4)=R-g_a(O4-D1)$

Figure 6:
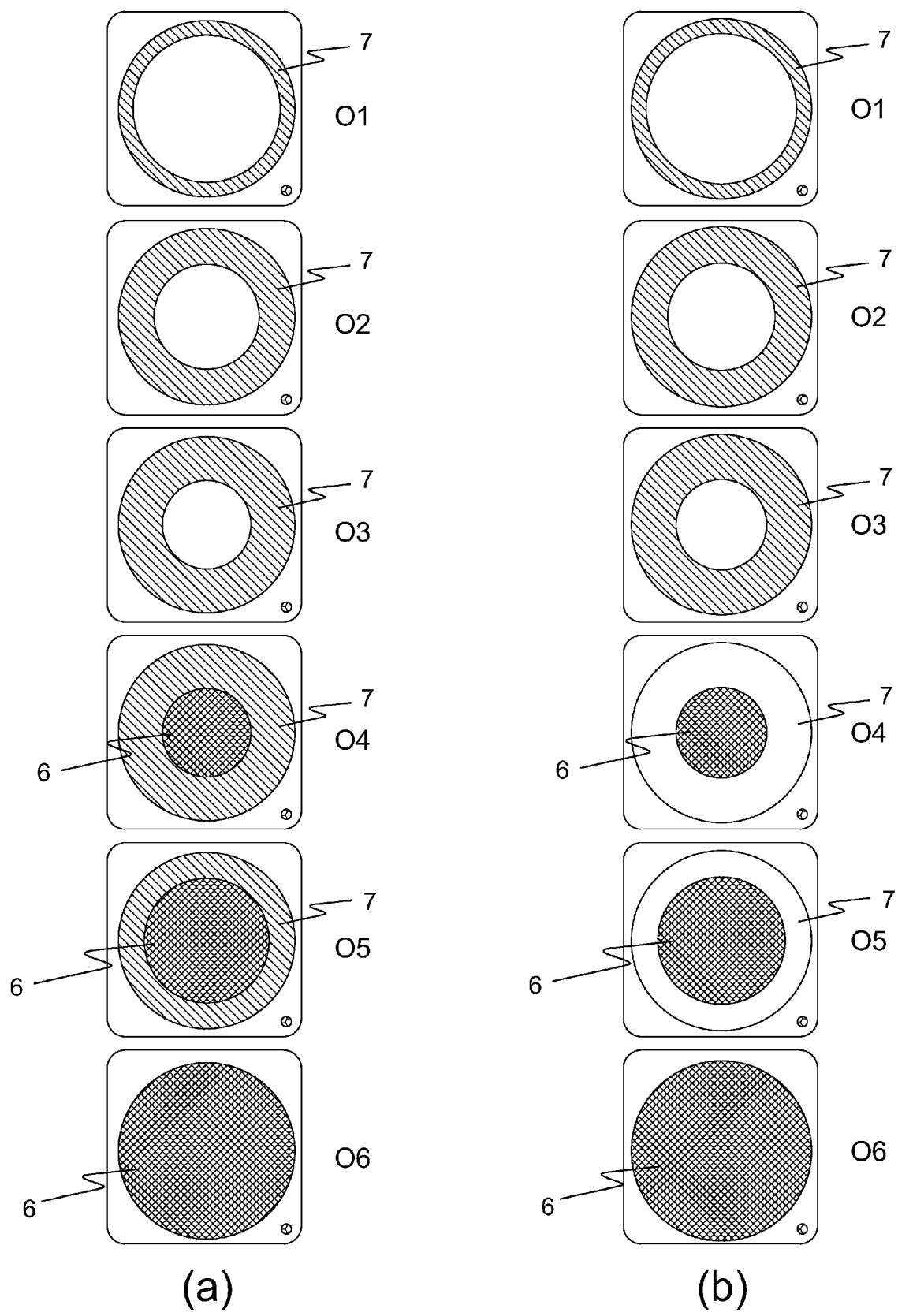
FIGS. 6(a)-6(b) show shows display units with representations for the obstacles of FIG. 5, FIGS. 7(a)-7(d) show shows display units with sector divisions of the obstacle information system of a helicopter according to the invention.

According to FIG. 6 corresponding features are referred to with the references of FIGS. 1 to 5. By switching from warning mode to alerting mode, the amber warning indication in the ring-shaped area 7 is maintained and partially overwritten by the red alert (FIG. 6a) or the amber warning indication in the ring-shaped area 7 is omitted and replaced by the red alert indication (FIG. 6b). The samples for indications of warnings and alerts at display unit 1 refer to the obstacles O1 to O6 around the helicopter at the distances shown in FIG. 5.

The obstacle O1 near the outer border of the warning zone $z_w$ of the helicopter results in an amber warning indication with a reduced ring-shaped area 7 with no difference for the presentations according to FIG. 6a or FIG. 6b. The obstacle O2 approximately in the middle of the warning zone $z_w$ of the helicopter results in an amber warning indication with an increased ring-shaped area 7 with no difference for the presentations according to FIG. 6a or FIG. 6b. The obstacle O3 near the inner border of the warning zone $z_w$ of the helicopter results in an amber warning indication with an almost maximum ring-shaped area 7 with no difference for the presentation according to FIG. 6a or FIG. 6b.

The obstacle O4 near the outer border of but inside the alert zone $z_a$ of the helicopter results in a red alert indication covering the circular surface 6 with a radius $r_{min}$ while omitting the amber warning indication in the ring-shaped area 7 according to FIG. 6b, whereas the presentation according to FIG. 6a for the obstacle O4 near the outer border of the alert zone $z_a$ of the helicopter results in a red alert indication covering the circular surface 6 with a radius $r_{min}$ while maintaining the amber warning indication in the maximum ring-shaped area 7.

The obstacle O5 at about the middle of the alert zone $z_a$ of the helicopter results in a red alert indication covering the circular surface 6 with a radius $r_a$>$r_{min}$ while omitting the amber warning indication in the reduced ring-shaped area 7 according to FIG. 6b, whereas the presentation according to FIG. 6a for the obstacle O5 at about the middle of the alert zone $z_a$ of the helicopter results in a red alert indication covering the circular surface 6 with a radius $r_a$>$r_{min}$ while maintaining the amber warning indication in the reduced ring-shaped area 7. The obstacle O6 inside the inner border of the alert zone $z_a$ of the helicopter results in a red alert indication covering all of the circular surface 6 and the ring-shaped area 7 with a radius $r_a$=R with no difference for the presentation according to FIG. 6a or FIG. 6b.

Figure 7:
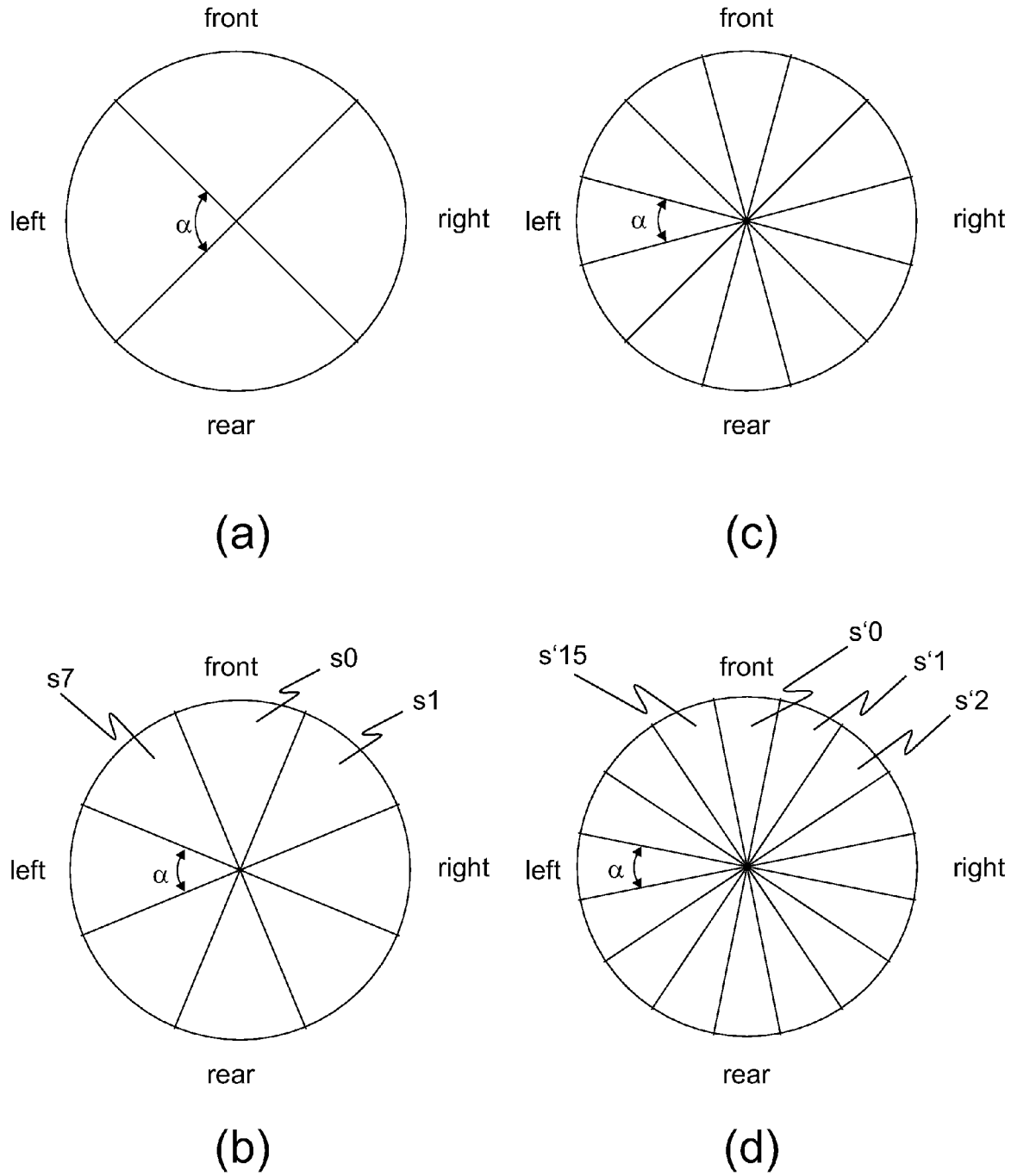

According to FIG. 7 corresponding features are referred to with the references of FIGS. 1 to 6. The display unit 1 is provided with sectors for indication of the direction around the helicopter in which the obstacle 2 has been detected. At least four different sectors are distinguished: front and rear, as well as left and right (FIG. 7a), or eight different sectors ($s_0$, $s_1$, ... $s_7$) with respective section angles α=45° are distinguished (FIG. 7b), or twelve different sectors with respective section angles α=30° are distinguished (FIG. 7c), or sixteen different sectors (s'$_0$, s'$_1$, s'$_2$, ..., s'$_{15}$) with respective section angles α=22.5° are distinguished (FIG. 7d).

Figures 8, 9:
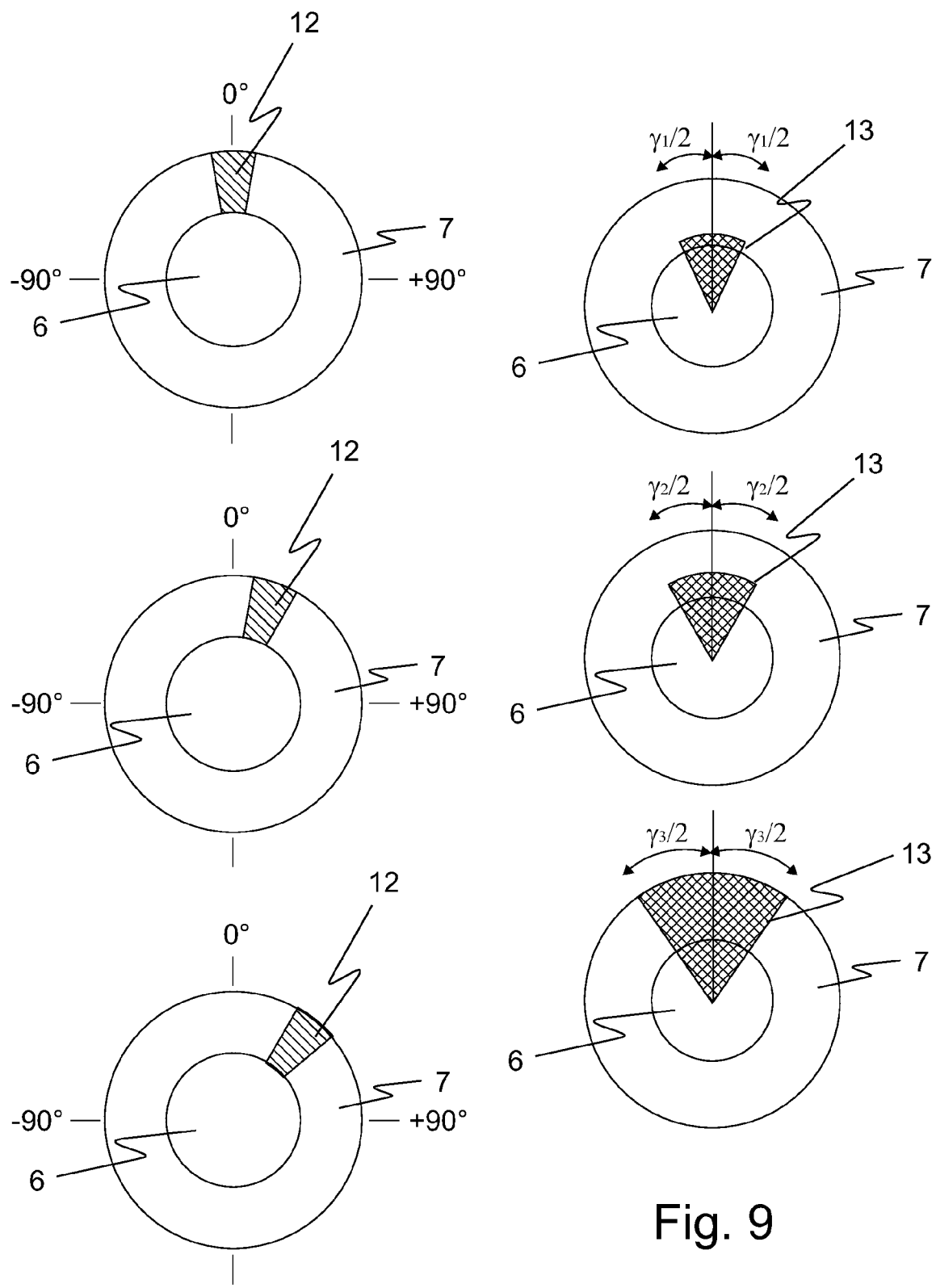
FIGS. 8, 9 show representations of obstacles in display units according to FIG. 7.

According to FIG. 8 corresponding features are referred to with the references of FIGS. 1 to 7. The presentation at the display unit 1 comprises the intersection of sixteen sectors (s'$_0$, s'$_1$, s'$_2$, ..., s'$_{15}$) with respective section angles α=22.5° (cf. FIG. 7d) with the distance warning/alert indication according to the preceding FIGS. 2-6. FIG. 8 top shows the display unit 1 for an obstacle 2 with a truncated cone 12 in the warning zone $z_w$ near to D2 (FIG. 2) in front of the helicopter, i.e. in section $s_0$, FIG. 8 middle shows the display unit 1 for the obstacle 2 with a truncated cone 12 in the warning zone $z_w$ near to D2 (FIG. 2) to the right, i.e. in section $s_1$ and FIG. 8 bottom shows the display unit 1 for the obstacle 2 with a truncated cone 12 in the warning zone $z_w$ near to D2 (FIG. 2) further to the right, i.e. in section $s_1$.

According to FIG. 9 corresponding features are referred to with the references of FIGS. 1 to 8. The presentation at the display unit 1 shows an obstacle in front of the helicopter at different distances inside the alert zone according to FIG. 2-6.

FIG. 9 top shows the display unit 1 for an obstacle 2 in the alert zone $z_a$ with a first cone 13 corresponding to the display radius $r_{a1} > r_{min}$ and with an opening angle γ1, FIG. 8 middle shows the display unit 1 for the obstacle 2 in the alert zone $z_a$ closer to the helicopter with a second cone 13 with an opening angle $γ_2 > γ_1$ and with a radius $r_{a2} > r_{a1}$ in the circular surface 6 and a bigger section of the ring shaped area 7 towards the front and FIG. 8 bottom shows the display unit 1 for the obstacle 2 inside the alert zone $z_a$ even closer to the helicopter with a third cone 13 with an even larger opening angle $γ_3 > γ_2$ and with a radius $r_{a3} = R$ covering an enlarged angular section $γ_3$ of the circular surface 6 and the ring shaped area 7 towards the front for increased attention to the pilot.

Figure 10:
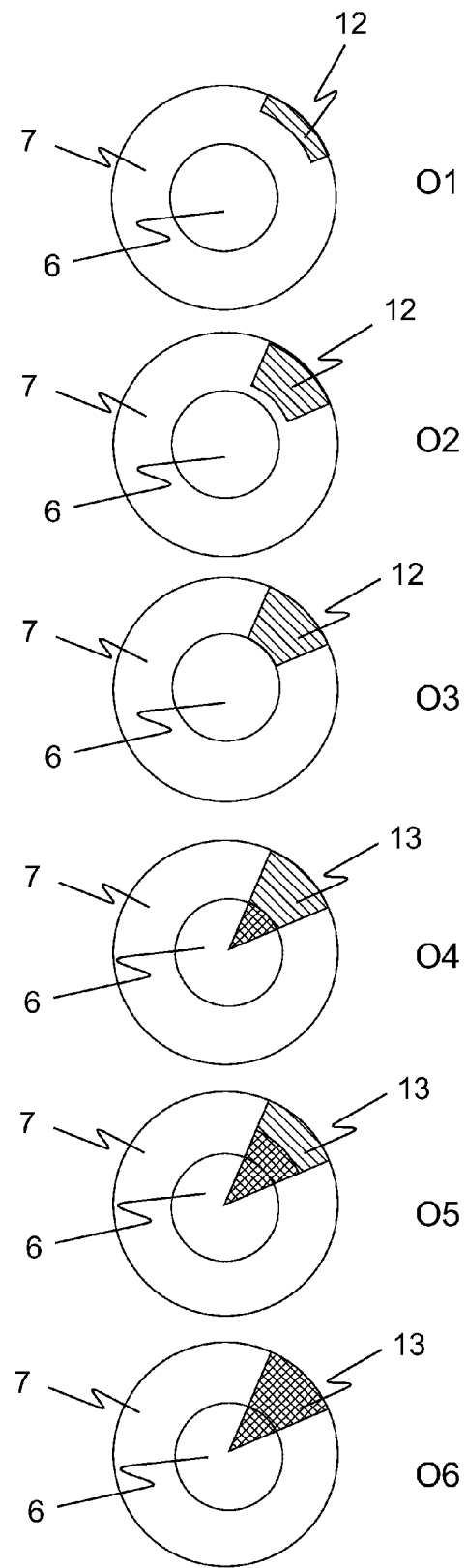
FIG. 10 shows representations of the obstacles of FIG. 5 in display units according to FIG. 7.

According to FIG. 10 corresponding features are referred to with the references of FIGS. 1 to 9. The presentation at the display unit 1 comprises the intersection of eight sectors 12, i.e. $s_0, \ldots s_7$, (cf. FIG. 7b) with the distance warning/alert indication according to the preceding FIG. 6 for respective obstacles O1 to O6 with an obstacle center 45° to the right, i.e. in section $s_1$.

FIG. 11 shows a catalogue of object symbols to be displayed by the warning information processor 4 at the display unit 1 after recognition by the obstacle sensor system (see FIG. 1) for an indication of the obstacle category/type.

For all directions/sectors it is always the closest obstacle to the aircraft which has priority for the indication.

REFERENCE LIST 1 display unit
2 obstacle
2' obstacle representation
3 warning information processor
4 obstacle sensor system
5 instrument status indication
6 circular surface
7 ring shaped area
8 reference mark
9 reference mark
10 reference mark
11 reference mark
12 truncated cone for warning indication
13 first-third cone as alert indication

What is claimed is:

1. An obstacle information system for a helicopter with a warning information processor and a display unit of any obstacle within a predetermined minimum distance d4 with regard to the helicopter, the warning information processor being fed with information related to detected distance d5 and direction of the at least one obstacle with regard to the helicopter detected by an obstacle sensor system to compute and prepare the information for presentation on the display unit, the display unit comprising at least an indication area with two sub-areas, a central circular surface and a concentric ring-shaped area around the circular surface, the circular surface being used exclusively for alerts, the ring-shaped area being used for both warnings as well as alerts and the repartition in the indication area of the circular surface and ring-shaped area being dependent on the detected distance d5 of the at least one obstacle with regard to the helicopter, characterized in that coloring is provided at least at a section of the ring-shaped area with an inner radius $r_w$, $r_w$ being the result of a projection $g_w$ of the at least one obstacle from a section d3 of a distance scale onto a section d3* of an indication scale, the projection providing a smaller inner radius $r_w$ of the colored ring-shaped surface the closer the obstacle is to an alerting distance d1+d2, with d1 being the radius of a concentric inner ring shaped alert zone $z_a$, d1+d2 being an inner warning radius and d1+d2+d3=d4 being an outer warning radius of an outer ring shaped warning zone $z_w$.

2. The system according to claim 1, wherein the display unit comprises an instrument status indication.

3. The system according to claim 2, wherein the instrument status indication provides the correct functioning, the malfunctioning, or the out-of-operation status of the instrument.

4. The system of claim 3, wherein the instrument status indication provides the correct functioning by a green light, the malfunctioning by a red light, or the out-of-operation status of the instrument without any light.

5. The system according to claim 1, wherein the circular surface has a minimum radius $r_{min}$ and the ring-shaped area has an outer radius R and a minimum inner radius $r_{min}$, with the radius $r_{min}$ being greater or equal to R/2.

6. The system according to claim 1, wherein the color is red in at least a section of the circular surface and a subsection of the ring-shaped area indicating an alert and the color is amber in the ring-shaped area indicating a warning.

7. The system according to claim 1, wherein the projection $g_w$ is logarithmic or linear.

8. The system according to claim 1, wherein a projection $g_a$ of a radius $r_a$ of the circular surface is inverse with regard to the projection $g_w$, if the obstacle is within the alerting zone $z_a$ at a distance d5 greater than d1, the projection providing, that the closer the distance d5 is to d1, the closer $r_a$ is to R.

9. The system according to claim 8, wherein the projection $g_a$ is a linear projection.

10. The system according to claim 1, wherein the values for d1 and d2 are greater or equal to a main rotor diameter and the value for d3 is greater or equal to the double of the main rotor diameter.

11. The system according to claim 1, wherein the indication of warnings and alerts comprises sectors for the direction relative to the helicopter in which the obstacle has been detected.

12. The system according to claim 11, wherein for more than one obstacle for all directions/sectors the closest obstacle to the helicopter has priority for the indication.

13. The system of claim 11, wherein the sectors for the direction relative to the helicopter in which the obstacle has been detected include at least four different sectors.

14. The system of claim 13, wherein the at least four different sectors include a front sector, a rear sector, a left sector, and a right sector.

15. The system of claim 13, wherein the at least four different sectors include 12 sectors, each with an angle a of 30°.

16. The system according to claim 1, wherein a sector for alert indication in the circular surface and the ring-shaped area is artificially increased by increasing a display angle γ in addition to an increase of a radius $r_a$ of the circular surface.

17. The system of claim 16, wherein the display angle γ includes a first portion γ/2 to the left and a second portion γ/2 to the right of the obstacle direction of the section of the surface.

18. The system of claim 1, wherein the warning information processor is further provided with information related to a category or type of the at least one obstacle detected by the obstacle sensor system.

19. The system according to claim 18, wherein a data base with a catalogue of object symbols is provided, representing distinguishable objects, the category/type information for the detected obstacle being overlaid as a Symbolic Obstacle Category Indication to the warning or alert indication.

20. A method of operating an obstacle information system of a helicopter by:
- feeding information related to detected distance d5 and direction of the at least one obstacle with regard to the helicopter detected by an obstacle sensor system;
- computing and preparing the information for presentation on the display unit, the display unit comprising at least an indication area with two sub-areas, a central circular surface and a concentric ring-shaped area around the circular surface,
- using the circular surface exclusively for alerts and using the ring-shaped area for both, warnings as well as alerts and
- repartitioning the indication area of the circular surface and the ring-shaped area dependent on the detected distance d5 of the at least one obstacle with regard to the helicopter, characterized by:
- providing coloring at least at a section of the ring-shaped area with an inner radius $r_w$, $r_w$ being the result of a projection $g_w$ of the at least one obstacle from a section d3 of a distance scale onto a section d3* of an indication scale, the projection providing a smaller inner radius $r_w$ of the colored ring-shaped surface the closer the obstacle is to an alerting distance d1+d2, with d1 being the radius of a concentric inner ring shaped alert zone $z_a$, d1+d2 being an inner warning radius and d1+d2+d3=d4 being an outer warning radius of an outer ring shaped warning zone $z_w$.

* * * * *